United States Patent Office 2,829,149
Patented Apr. 1, 1958

2,829,149

NEW FUCHSINE CYANIDE

Lyman Chalkley, Prince Georges County, Md.

No Drawing. Application June 29, 1956
Serial No. 594,687

2 Claims. (Cl. 260—391)

This invention relates to an improved dye cyanide for use in preparing photo-sensitive materials.

More in particular this invention relates to a substituted triphenylacetonitrile, that is light sensitive in the presence of suitable photo activators such as those disclosed in my Patent No. 2,676,887 and copending application Serial No. 547,338. This dye cyanide in conjunction with the activators disclosed in said patent and application are used in the preparation of photo-sensitive material. Photo-sensitive systems of this type have also been disclosed in my prior Patents No. 2,325,038 and No. 2,366,179.

It is an object of this invention to produce a new substituted triphenylacetonitrile which may be activated so that it is converted by ultraviolet radiation into a permanent dye.

It is also an object of this invention to produce a dye cyanide that may be used in the preparation of light sensitive material for photographic and photo-sensitive processes.

It is a still further object of this invention to produce a dye cyanide from New Fuchsine.

4,4′,4″-triaminotriphenylacetonitrile and 4,4′,4″-triamino-3-methyl-triphenylacetonitrile are already known. (See Emil and Otto Fischer, Liebig's Annalen der Chemie, volume 194, pages 274, 275 (1878).) These are hydrophobic dye cyanides and when properly activated, as taught by example in U. S. Patent 2,676,887, are converted by ultraviolet radiation into the brilliant dyes pararosaniline and rosaniline.

This new dye cyanide 4,4′,4″-triamino-3, 3′,3″-trimethyltriphenylacetonitrile, which is a colorless hydrophobic trimethyl dye cyanide, is prepared by reacting New Fuchsine, Color Index #678, with sodium cyanide.

This dye cyanide is capable of photo activation and when so reactivated is converted by ultraviolet radiation into the dye New Fuchsine.

A method for the preparation of the new compound is given below, although other methods of preparation may also be used.

*Example*

Twenty-five grams of Magenta ABN (General Dyestuffs Corporation brand of New Fuchsine) is dissolved in 350 ml. of boiling water, the solution cooled to 45° C., filtered, and the filtrate treated with a solution of 5.3 g. of 95% sodium cyanide in 25 ml. of water. Reaction begins immediately with precipitation of the new compound. The reaction mixture is allowed to stand in the dark at room temperature for 12 hours, and the following operations carried out by yellow light. The reaction product that has precipitated is collected on a filter, washed on the filter with 1000 ml. of water, and air dried at 50° C.

Purification is carried out as follows: Ten grams of the dry crude product is dissolved by stirring at 25° C. in a mixture of 75 ml. of triethyl phosphate and 25 ml. of water. The solution is filtered and put in a 400 ml. beaker and stirred while water is added drop by drop at the rate of 2 ml. per hour until a total of 100 ml. of water has been added. The nearly colorless crystalline precipitate is collected on a filter, washed with water until the wash is colorless, and dried in a vacuum desiccator over sulfuric acid. A second drop of slightly less pure material may be obtained by treatment of the mother liquor with 700 ml. more water added all at once.

The pure product is colorless and crystalline, and has the formula

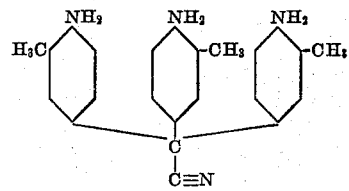

This dye cyanide is used in combination with suitable photoactivators to prepare photo-sensitive solutions, papers, films, plates and the like which are then rendered sensitive to ultraviolet radiation and produce an image thereon which is bluer and thus "darker" in color and has greater visual depth than fuchsine and parafuchsine heretofore used. Papers of this type find use in photographic and photo-duplication processes which have come to be so widely used in modern applications. This dye cyanide is especially useful because it is not subject to conversion by visible light and the materials containing this dye may be handled without fogging in visible light free of ultraviolet and are only converted by ultraviolet radiation to form the strong dye that makes up the image obtained by photo-duplication processes.

It should be understood that while this dye cyanide has been illustrated by the preferred method of preparation and by its application to certain processes it is not limited to the precise procedure described above, but is only limited by the scope of the claims appended hereto.

What is claimed is:

1. As a product, 4,4′,4″-triamino-3,3′,3″-trimethyl triphenylacetonitrile, having the formula

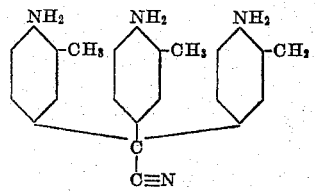

2. A solid composition photo-sensitizer to ultraviolet and shorter wave length light, consisting essentially of as an active ingredient 4,4′,4″-triamino-3,3′,3″-trimethyl, triphenylacetonitrile having the following formula

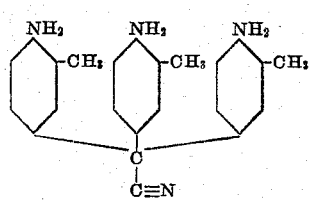

References Cited in the file of this patent

UNITED STATES PATENTS 2,325,038    Chalkley _____ July 27, 1943

OTHER REFERENCES

Fischer: Liebig's Annalen der Chemie, 194, 274–5 (1878).

Colour Index, 1924, page 173 (Dye No. 678).

Sidgwick's Organic Chemistry of Nitrogen, Taylor and Baker, Oxford (new edition), page 90, 1937.